(12) United States Patent
Sandstede et al.

(10) Patent No.: US 8,389,781 B2
(45) Date of Patent: Mar. 5, 2013

(54) CATALYST WITH SUPPLEMENT COMPONENT FOR HYDROPROCESSING OF BIO-FEEDSTOCK

(75) Inventors: Gerd Sandstede, Frankfurt (DE); Thomas Lehmann, Frankfurt (DE)

(73) Assignee: Aggregate Energy, LLC, Burley, ID (US)

( * ) Notice: Subject to any disclaimer, the term of this patent is extended or adjusted under 35 U.S.C. 154(b) by 760 days.

(21) Appl. No.: 12/491,006

(22) Filed: Jun. 24, 2009

(65) Prior Publication Data
US 2010/0314295 A1 Dec. 16, 2010

Related U.S. Application Data

(63) Continuation of application No. PCT/EP2009/057319, filed on Jun. 12, 2009.

(51) Int. Cl.
*C10G 45/00* (2006.01)

(52) U.S. Cl. ......... 585/240; 208/142; 208/143; 585/250; 585/275; 585/276; 585/277; 585/469; 585/638; 585/733; 568/852; 568/876; 568/884; 568/885; 426/313

(58) Field of Classification Search .......... 502/150, 502/159, 200, 216–223, 228–229; 208/142–143; 585/240, 250, 275–277, 469, 638, 733, 841; 568/852, 876, 884–885; 426/313; 436/55
See application file for complete search history.

(56) References Cited

U.S. PATENT DOCUMENTS

| | | | |
|---|---|---|---|
| 4,284,835 A | 8/1981 | Kim et al. | |
| 4,992,605 A | 2/1991 | Craig et al. | |
| 5,705,722 A | 1/1998 | Monnier et al. | |
| 6,395,934 B1 * | 5/2002 | Wegener et al. | 564/422 |
| 7,425,657 B1 | 9/2008 | Elliott et al. | |
| 7,670,985 B2 * | 3/2010 | Ding et al. | 502/180 |
| 2003/0004059 A1 | 1/2003 | Haake | |
| 2005/0029164 A1 * | 2/2005 | Moy et al. | 208/209 |
| 2007/0010682 A1 | 1/2007 | Myllyoja et al. | |
| 2008/0280754 A1 * | 11/2008 | Toledo Antonio et al. | 502/177 |
| 2008/0312480 A1 * | 12/2008 | Dindi et al. | 585/240 |

FOREIGN PATENT DOCUMENTS

| | | |
|---|---|---|
| CN | 1 554 728 | 12/2004 |
| DE | 600 24 004 T2 | 6/2006 |
| EP | 0 054 393 | 6/1982 |
| EP | 1 396 531 | 3/2004 |
| EP | 1 681 337 | 7/2006 |
| EP | 1 685 892 | 8/2006 |
| EP | 1 920 832 | 5/2008 |
| GB | 809 339 | 2/1959 |
| GB | 1 240 580 | 7/1971 |
| WO | WO 95/10481 | 4/1995 |
| WO | WO 01/17677 | 3/2001 |
| WO | WO 2007/027079 | * 3/2007 |
| WO | WO 2007/103027 | 9/2007 |

OTHER PUBLICATIONS

Satterfield, C.N. (1980), Heterogenous Catalysis in Practice, McGraw-Hill, 416 pgs.*
Lassi U. (2003). Deactivation Correlations of Pd/Rh Three-way Catalysts Designed for Euro IV Emission Limits, Department of Process and Environmental Engineering, University of Oulu, Section 3.2.1.*
Furimsky, E. (2000). Applied Catalysis A, 199,147-190.*
Sivasamy, Arumugam et al., "Catalytaic applications in the production of biodiesel from vegetable oils," ChemSusChem 2009, 278-300, vol. 2.
DGMK-Conference Report 2008-2 D. Kubicka, J. Chudoba, P. Simacek: "Catalytic conversion of vegetable oils into transportation fuels" pp. 101-106.
DGMK-Conference Report 2008-3, Endisch et al., "Vegetable oil hydrotreating for prduction of high quality diesel components," pp. 27-34.
Furimsky, "Catalysts for upgrading heavy petroleum feeds" Studies in surface Science and Catalysis, vol. 169, pp. 1-387, Elsevier, Amsterdam 2007.
Shao et al., "Novel catalyst support materials for PEM fuel cells: current status and future prospects," J. Mater. Chem., 2009, 19, pp. 46-59.

* cited by examiner

*Primary Examiner* — Brian McCaig
(74) *Attorney, Agent, or Firm* — Thorpe North & Western LLP

(57) ABSTRACT

The catalyst comprises at least a metal component and at least a non-metallic conducting component as supplement component. The metal component generally contains one or more metals of the groups VIb, VIIb or VIIIb of the periodic table. The supplement component is e.g. a conducting carbon material like graphite, a conducting polymer or a conducting metal oxide. Preferably it is hydrophobic or made hydrophobic. The catalyst is used for hydroprocessing of bio-feedstock like vegetable oils to produce fuels, which are aliphatic hydrocarbons comparable to conventional fuel from mineral oil.

13 Claims, No Drawings

CATALYST WITH SUPPLEMENT COMPONENT FOR HYDROPROCESSING OF BIO-FEEDSTOCK

PRIORITY CLAIM

This is a continuation of PCT Application Serial No. PCT/EP2009/057319, filed Jun. 12, 2009, which is hereby incorporated herein by reference in its entirety.

FIELD OF THE INVENTION

1. Background

The invention relates generally to catalysts for the hydrogenation of organic compounds.

2. Related Art

The hydrogenation of fractions from refining of crude oil with the help of special catalysts has been known for some time. By hydroprocessing, which comprises hydrogenation, hydrocracking and hydrotreatment, gasoline and diesel fuels are produced, which are low and medium-sized hydrocarbons. Such hydrogenating catalysts are described in WO 2007/103027 A1 and in the book "E. Furimsky: 'Catalysts for upgrading heavy petroleum feeds', Studies in Surface Science and Catalysis, Vol. 169, Elsevier, Amsterdam 2007".

A process for hydroprocessing of vegetable oils in order to produce fuels with conventional commercially available catalysts is disclosed in U.S. Pat. Nos. 4,992,605 and 5,705,722. A similar two-stage process for the production of hydrocarbons is described in EP 1396531 B1. Catalytic methods for the production of biodiesel from vegetable oils are reviewed in ChemSusChem 2008, 2, 278-300.

Conventional catalysts used for hydroprocessing of vegetable oils have disadvantages with regard to products and side reactions. In order to understand the problems involved the hydroprocessing of vegetable oils will be described briefly, starting with the total reaction, which can be specified in general by:

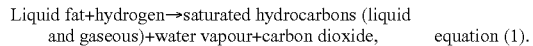

Obviously not only hydrogenation of unsaturated carbon bonds takes place, but also oxygen is removed by formation of water and carbon dioxide. High pressure and high temperature have to be applied for this hydroprocessing. It is continued with triolein (oleic acid glycerine ester; $(C_{17}H_{33}COO)_3 C_3H_5$ or $C_{57}H_{104}O_6$) as an example for liquid fat. In the hydrogenation of triolein a possible reaction is:

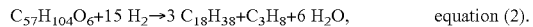

Only water vapor and the saturated hydrocarbons octadecane ($C_{18}H_{38}$) and propane ($C_3H_8$) are formed. Looking at the course of the total reaction, at first the double bonds of the fatty acid residues are hydrogenated and then the ester bonds are split by hydrogenation into the liquid hydrocarbon octadecane and liquid glycerine, which is immediately reduced by hydrogen into propane, which is a gas. This route of hydrogenating cleavage shall be called hydrodeoxygenation, which is a hydrogenation coupled with a dehydration (water removal).

In addition, another reaction route in hydroprocessing is possible, namely:

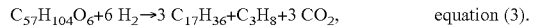

In this reaction no water vapour but only carbon dioxide and the hydrocarbons liquid heptadecane ($C_{17}H_{36}$) and gaseous propane ($C_3H_8$) are formed. Such type of reaction shall be called hydrodecarboxylation, which means hydrogenation coupled with removal of oxygen as carbon dioxide. Whereas most processes of hydroprocessing of vegetable oils take place according to hydrodeoxygenation route, there are a few where hydrodecarboxylation occurs, but there is so far no process known, where decarboxylation predominates. The subject is briefly described in "M. Endisch, U. Balfanz, M. Olschar, Th. Kuchling: 'Vegetable Oil Hydrotreating for Production of High Quality Diesel Components', in DGMK-Conference Report 2008-3" and "D. Kubicka, J. Chudoba, P. Simacek: 'Catalytic Conversion of Vegetable Oils into Transportation Fuels', in DGMK-Conference Report 2008-2". In addition, US 2007/0010682 A1 gives some background information.

Generally speaking, any oxygen containing liquid biological products, including so-called bio-oil, produced by pyrolysis of bio-mass, can be treated by hydroprocessing. Such products (potential feedstocks) are ubiquitously available as waste materials in agriculture and food industry.

The amount of hydrogen, which will be consumed during hydroprocessing, is an important factor for the economy of the process. In the above model reactions 15 mol of hydrogen per mole of triolein are necessary in the hydrodeoxygenation pathway (equation (2)), whereas only 6 mole hydrogen per mole of triolein are needed for the hydrodecarboxylation route (equation (3)). Consequently, a catalyst is favourable, which promotes hydrodecarboxylation.

Carbon containing catalysts for hydroprocessing are described in the book "E. Furimsky: 'Carbons and carbon supported catalysts in hydroprocessing', Royal Society of Chemistry, Cambridge 2008". The carbon components of the catalysts mentioned there are primarily support materials, which are non-conductive, for instance active carbon.

Another type of catalyst is disclosed in DE 60024004 T2, where carbon is deposited in the pores of a support by carbonisation of an organic material after impregnation in order to decrease the acidity of acidic functions of the support material. The carbon is not conducting.

SUMMARY OF THE INVENTION

The invention relates generally to catalysts for the hydrogenation of organic compounds, in particular of vegetable oils and animal fats; and furthermore to a process for hydrogenating and cracking of oxygen containing biological or organic products, also in a mixture with fractions from crude oil refinery, and the use of a material with a non-metallic conductive component in a catalyst for hydrogenation, in particular for hydroprocessing of vegetable oils and other biological products in order to produce fuels, which are aliphatic hydrocarbons comparable to conventional fuel from mineral oil.

One object of the present invention is to provide an alternative catalyst for the hydrogenation of liquid biological products like vegetable oils in the production of bio-fuel.

In accordance with one aspect, the present invention comprises a catalyst in accordance with the features described herein. The catalyst can contain at least one non-metal conductive component or non-metallic conductive component, where conduction comprises electrical conduction, semi-conduction and ion-conduction. The catalyst can contain at least one metal component or metallic component and at least one non-metallic conductive component (designated also as "supplement component" in the following). The catalyst is obtainable by employing particles, a powdery or particulate form or a dispersion of the non-metallic conductive component in the preparation of the catalyst. The catalyst is also obtainable by employing a solution of the non-metallic conductive component in the preparation of the catalyst, if the non-metallic conductive component can be dissolved in a solvent. The catalyst can be obtainable by employing particles, a powdery or particulate form or a dispersion of the non-metallic conductive component and of the metal component in the preparation of the catalyst.

Advantageously, the catalyst can contain a support material or a carrier as further component. Optionally, the catalyst can contain a binding agent.

The term "catalyst" can include a precursor of the catalyst or a so-called pro-catalyst. Generally such precursors or pro-catalysts are transformed to the working state or active form of the catalyst by a chemical or physical treatment or activation. Such transformation may change only the surface or near surface regions of the precursor and it may occur under working conditions, i.e. in situ in a reaction, in which the catalyst is used. A physical treatment for example changes the morphology of the whole precursor material or its surface, e.g. by a leaching process. A physical treatment may change the chemical composition of the surface or the whole precursor. A physical modification may be combined with a chemical modification. A catalyst may also be a set of separate components like a mixture of separate particles or combined parts, that synergistically act together, generating a catalytic effect or an improvement of catalytic action.

DETAILED DESCRIPTION OF EMBODIMENT OF THE INVENTION

In general the non-metal conductive component contains an electronically conducting, semi-conducting or ion conducting material, which is not a metal. Such materials are for example electrically conductive or semi-conductive carbon materials like graphite, graphite-containing materials, graphitized carbon, graphite-like materials, conductive soot, conducting carbon blacks, crystalline carbon, carbon nanotubes (single-wall, double-wall and multi-wall carbon nanotubes), carbon fibers, carbon nanofibers, mesoporous carbon, fullerenes (e.g. $C_{60}$, $C_{70}$) and conductive diamond materials like conductive doped diamonds and doped diamond materials, in particular diamond particles, doped with boron up to 3000 ppm, and nano-diamonds. The conductive carbon materials are generally used as particles, in particular as solid particles, in the production of the catalyst.

Other useful non-metal conductive materials are electrically conductive or semi-conductive polymers and ion-conducting polymers. Conductive polymers are for instance polyaniline (PANI), polythiophene, polypyrrol, polyacetylene, polyparaphenylene, polyparaphenylenvinylene, poly-ethylendioxythiophen or polybenzimidazol (PBI). The conductivity of these polymers is established or enhanced by oxidation or reduction. Ion-conducting polymers are for instance ion exchange materials or ion exchange resins and in particular sulfonated polymers like sulfonated polytetrafluoroethylene (e.g. Nafion® from Dupont), sulfonated polyarylene sulfides, sulfonated polyphenylene sulfide (PPS), sulfonated polyetheretherketon (PEEK), polyphosphazene or polyphosphazene containing materials. Ion-conducting substances are also fullerene hydrides like $C_{60}H_x$ with x=1 to 60, $C_{70}H_x$ with x=1 to 70. Polyphthalocyanins are further examples of supplement materials.

The organic conductive materials may decompose to a certain extent, because the reaction temperature in hydroprocessing lies generally above 300° C., but none-the-less they show similar activity like the inorganic materials. There are some organic materials, which are stable under such conditions, e.g. phosphoric acid stabilized PBI.

Inorganic materials like conductive metal oxides, in particular conductive oxides like tin oxide/indium tin oxide, titanium oxides, zirconium oxides, cerium oxides and tungsten oxides, are also suitable supplement components. Furthermore ion-conducting (e.g. proton or oxygen conducting) perovskites, $Na^+$ super ionic conductor NASICON and other ceramic ion-conductors are applicable. Such materials are described e.g. in EP 1685892 A1. Oxygen conducting doped zirconium oxide and other conductive inorganic compounds, e.g. tungsten carbide, are further examples of non-metal conductive components. Furthermore, conductive and semi-conductive metal oxides and mixed metal oxides, particularly such and metallates containing cobalt, vanadium, iron, nickel, manganese and tungsten are advantageously used. For example, a process involving the reduction of aqueous metallate solutions with aqueous alkali metal borohydrides at ambient temperatures yields amorphous or nanocrystalline transition metal oxide materials, like amorphous or nanocrystalline $VO_2$, $CrO_2$, $MoO_2$, or $LiMn_2O_4$. In addition, perovskite-based metal oxides that exhibit mixed electronic and ionic conductivity are attractive materials for a supplement component.

Many of the aforementioned carbonaceous or carbon materials are intrinsically hydrophobic. Those materials with little or none hydrophobicity can be advantageously treated chemically or modified on the surface in order to create such property. The hydrophobicity of intrinsic hydrophobic materials may be enhanced or modified accordingly. A well-established method is the fluorination in the gaseous phase or with other fluorinating agents. As an example, carbon nanotubes are fluorinated by fluorine gas in a rotary furnace at a temperature of 150° C. Inorganic oxides and catalysts containing such materials can be made hydrophobic by treating the component (pre-treatment) or the whole catalyst with fluoro-alkyl silanes or fluoro-alkyl siloxane. A treatment with silicon tetrachloride is also possible.

The application of a supplemental component with hydrophobic properties, in particular with high hydrophobicity, has a beneficial effect on the catalyst with regard to hydrodecarboxylation. Therefore, a further embodiment of the present invention is a catalyst for hydrogenation (in particular hydroprocessing or hydrotreating), preferably in the production of fuels, particularly in the production of biofuels from biogenic materials, wherein the catalyst contains one or more hydrophobic non-metal conductive components or one or more non-metal conductive components, which are hydrophobized.

Advantageously, fluorination, in particular a partial or total fluorination, is applied to achieve hydrophobic, improved or optimized hydrophobic properties of the non-metal conductive component or its surface, e.g. partial or total fluorination is applied to carbonaceous materials like carbon black, graphite, graphite containing material, carbon nanotubes, carbon nanotube containing materials or mixtures thereof or diamond.

Also mixtures of hydrophobic components or hydrophobized components, from the same or different material, mixtures of less or non-hydrophobic components with more hydrophobic components and mixtures of non-hydrophobic and hydrophobic components are beneficial for use as a non-metal, conductive component.

Examples of these mixtures and blends are: carbon black with fluorinated carbon black; graphite with fluorinated graphite; fluorinated carbon nanotubes with carbon nanotubes, diamond with fluorinated diamond; diamond with carbon nanotubes; diamond with graphite; fullerene hydride with fluorinated fullerene hydride; mixtures or blends of sulfonated polymer with carbon black or graphite or graphitic material or doped diamond powder or carbon nanotubes or fluorinated carbon black or fluorinated graphite material or fluorinated doped diamond powder or fluorinated carbon nanotubes or polyphthalocyanins or fullerenes; mixtures of carbon black with sulfonated polymer or polyaniline or polythiophene or polypyrrole or polyacetylene or polybenzimidazole or polyphthalocyanins or fullerenes; mixtures of fluorinated carbon black with polyaniline or polythiophene or polypyrrole or polyacetylene or polybenzimidazole or polyphthalocyanins or fullerenes; mixtures of carbon nanotubes with polyaniline or polythiophene or polypyrrole or polyacetylene or polybenzimidazole or polyphthalocyanins or fullerenes; mixtures of a conductive metal oxide with carbon black or graphite or graphitic material or graphite containing material or carbon nanotube or doped diamond powder or fullerene hydride or polyaniline or polythiophene or polypyrrole or polyacetylene or polybenzimidazole or polyphthalocyanins or fullerenes; mixtures of perovskite material or other inorganic conductive materials with carbon black or graphite or graphitic material or graphite containing material or carbon nanotube or doped diamond powder, fullerene or fullerene hydride or polyaniline or polythiophene or polypyrrole or polyacetylene or polybenzimidazole or fluorinated carbon black or fluorinated graphite fluorinated material or fluorinated doped diamond powder or fluorinated carbon nanotubes or polyphthalocyanins or fullerenes; ternary mixtures of carbon black and perovskite material or other conducting inorganic material with graphite or graphitic material or doped diamond powder or polyphthalocyanins or fullerenes or fullerene hydride or polyaniline or polythiophene or polypyrrole or polyacetylen or polyacetylene or polybenzimidazole or fluorinated carbon black or fluorinated graphite or fluorinated graphitic material or fluorinated carbon nanotubes.

Mixtures of conductive inorganic materials with hydrophobic or hydrophobized conductive carbon materials or hydrophobic or hydrophobized conductive polymers are very advantageous for use as supplement component, e.g. mixtures of conductive metal oxides or conductive ceramic materials with graphite, fluorinated graphite, fluorinated carbon nanotubes, fluorinated diamond, Nafion, hydrophobized conductive polymers or fullerenes.

Binary mixtures of the non-metallic conducting component, especially for the aforementioned examples, are applied in mixing ratios of 1:99, 99:1, 5:95, 95:5, 10:90, 90:10, 80:20, 20:80, 30:70, 70:30, 40:60, 60:40 and 50:50. Ternary mixtures of the non-metallic conducting component, especially for the aforementioned examples, are applied in equal mixing ratios or with an excess of one component in the mixture. For example the following ratios are applied: 1:1:98, 98:1:1, 1:98:1, 5:5:90, 5:90:5, 90:5:5, 10:10:80, 10:80:10, 80:10:10 or 10:20:70.

The non-metallic conducting material can be applied as an impregnating solution or dispersion to coat preferably porous supports like alumina, zeolithe, silica or active carbon or a non-metal conducting material like a carbonaceous porous powder. For example, to impregnate with a solution of a soluble sulfonated polymer or a suspension of a dispersed material like Nafion®, polyaniline or CNT the suspension or solution is brought in contact with the support generally at temperatures, where the polymer material is stable, preferably at room temperature. After some contacting time the solvent is evaporated and the impregnation procedure is repeated, if necessary. The pores of a support may be loaded with a fine dispersion of any non-metallic conducting material, preferably with very fine dispersions or nano-dispersions, which fit into the pores.

The catalyst, in particular the metallic component, contains at least one metal of the metals cobalt (Co), rhodium (Rh), iridium (Ir), nickel (Ni), palladium (Pd), platinum (Pt), chromium (Cr), molybdenum (Mo) or tungsten (W) as a constituent, which preferably is a pure metal, a mixture of metals or an alloy. The mentioned metals are at least in part present in the metallic, unoxidized form, when the catalyst is in use. A pro-catalyst may contain the metals completely as salts. Therefore a metal constituent of the metallic component may be partly or totally a metal salt or an ionic form.

Advantageously, the catalyst contains two or more metallic components, for instance nickel and molybdenum or cobalt and molybdenum. The metallic form can be generated by in situ reduction of the salt under hydrogenating conditions. For example a metal component is prepared by soaking a support material with a solution of metal salts, e.g. nickel nitrate and ammonium molybdate, with subsequent reduction of the metal ions to metal.

Preferably the metallic component is present in the catalyst in fine and more preferably in very fine distribution. The particle size of a metallic component, especially when used in the preparation of the catalyst, is usually below 10 mm, preferably below 1 mm or more preferred below 0.1 mm, most preferred below 0.01 mm, in particular around 1 µm or below. The particle size of a metallic component, which is prepared by in-situ reduction, generally lies within the range of 10 to 1000 nm, preferably 10 to 100 nm.

A metallic component distributed or dispersed in a catalyst may be produced by using a powder or dispersion of one, two or more metals, e.g. a mixture of powders or dispersions of two or more metals. A very fine distribution of a metallic component can be generated on a support material or carrier by using a metal salt solution of the corresponding metal or metals, in particular by soaking or wetting of a support material with the metal salt solution, optional drying and subsequent reduction to the metal. Such a metal loaded support material, usually as powder, may be used in the preparation of a catalyst.

A further method for the preparation of finely divided, highly active catalysts is the Raney method. For example, in order to obtain Raney-nickel-molybdenum, nickel powder together with some molybdenum powder is mixed with about the double amount of aluminium powder and the mixture is heated until the alloying reaction starts. The procedure yields a Ni—Mo—Al-alloy, in particular $Ni_{0.8}Mo_{0.2}Al_3$ with a density of ca. 3.9 g/cm³. After cooling, the Raney alloy is normally ground and the grained alloy is treated with potassium hydroxide solution for activation, which removes the aluminium under formation of hydrogen, which is called activation. The hydrogen has to be removed during drying, because Raney nickel is pyrophoric. The Raney alloy may be used with or without activation as a metal component in the preparation of the catalyst. For example, the non-activated Raney alloy as powder may be sintered together with nickel powder on top of a metal surface of a metallic carrier. The activation may be carried out in a later stage in the preparation of the catalyst.

A catalyst advantageously contains a Raney alloy, preferably with nickel as a main component. The catalyst contains e.g. nickel and molybdenum or cobalt and molybdenum in an atomic ratio in the range of 10:1 to 1:1. Generally the total metal content in the catalyst (based on the metals of the groups VIb to VIIIb of the periodic table, including all oxidation states of the metals, i.e. metal ions; calculated as atoms for all metal species) lies in the range of 1 to 90 wt.-%, preferably 2 to 40 wt.-%, more preferred 3 to 30 wt.-%, in particular 5 to 30 wt.-%.

The catalyst, the metallic component or components of the catalyst can be modified, for instance by sulfiding. Sulfiding is a common process in the preparation of hydrogenation catalysts, where the catalyst is treated e.g. with $H_2S$ or $CS_2$.

Preferably, the catalyst contains a supporting material or a carrier. Supporting materials are for instance alumina (aluminium oxide), silica, Faujasit-silica, precipitated or pyrogenic silica, diatomecious earth, zeolithes, ceramic materials, metal or active carbon. The supporting materials are preferably used as powders or granules. The particle size ranges e.g. between 0.01 and 5 mm, preferably between 0.1 and 3 mm, in particular between 0.1 and 1 mm. Carriers are e.g. shaped bodies, plates or plate like materials, made of e.g. metal or ceramic.

Advantageously a conductive polymer (e.g. Nafion®, PANI or PBI) can also be used as a supporting material or carrier for the metal component. Furthermore a metal component and a conductive polymer can be combined with a supporting material, for example by treating (e.g. soaking) a supporting material with a solution or dispersion of a conductive polymer and a solution of a metal salt or a metal dispersion or their mixture.

Optionally, the catalyst of the invention contains a binding agent. The binding agent can be an organic or inorganic material. The binding agent is preferably a thermally stable material, in particular it is stable at the reaction temperature of the catalysed reaction, e.g. a temperature of 330° C. There are only a few polymers with high thermal stability like some fluorine-containing polymers, in particular PTFE (polytetrafluoroethylene), which is preferably used, e.g. as a powder. It is also possible to use aluminium oxide hydrate or silicon dioxide hydrate, where the structure is solidified by removing water and sintering. Another possibility is sintering with a metal powder, e.g. socalled carbonyl-nickel, which is a fine metal powder produced produced by degradation of gaseous nickel carbonyl.

A process for production of the catalyst is preferably a process using constituents or components in powder form. It usually starts with a mixture of the metallic and supplemental components, i.e. a powdery mixture of the constituents of the metal component and the supplemental component of the catalyst to be prepared. Preferably a pore forming material, for instance highly porous aluminium oxide and coarsely ground sodium chloride or sodium sulfate, and a binding material, e.g. PTFE, are added. The resulting mixture can be pressed to obtain shaped bodies, for example big pellets, which are ground to a coarse powder, or small pellets (e.g. with a size of 0.2 to 7 mm), which can be used as such. These products are thermally sintered and are treated with water to dissolve the pore forming salt and then, after drying, they may be activated or modified. In the case of preparing catalysts for hydroprocessing they are generally sulfidized.

For example, the composition of such a shaped body (e.g. pellet) consists of a proportion of 50 vol.-% catalyst material and 50 vol.-% binding material, including a pore builder. The latter consists of 25 vol.-% PTFE and 25 vol.-% water free sodium sulfate as pore builder. The catalyst material portion e.g. consists of about ⅓ of the metal powder, ⅓ of the supplement component and ⅓ of a support material, all numbers expressed as volume fractions. This third constituent of the catalyst material portion may be aluminium oxide with a porosity of about 50%. The composition may vary in a wide range.

For instance, the metallic portion is reduced to only of a few percent, if it is fixed to a support. If a higher porosity is needed, the amount of sodium sulfate is increased.

A stronger bonding of the pellet is accomplished, if the amount of binder is increased. For example the amount of binder is at least 10 vol.-%, preferably at least 20 vol.-%, to produce a shaped body of good stability.

After all parts of the pellet are mixed the mass is pressed into the form of a pellet and then heated to 400 to 500° C. in order to sinter it, which means binding of the PTFE particles. Mostly PTFE was chosen as binding agent, but other polymers are likewise possible. A further variety is the binding by nickel. The fine nickel powder can be sintered at a temperature of about 600° C. to give a stable pellet. The shaped bodies can take any form, for instance cylinders, cubes, spheres and such other rounded bodies, which can be easily prepared by pressing. Also the sizes can be varied in a wide range and depend on the requirements of the production plant.

The catalyst is preferably obtainable from mixtures of at least one powder or particulate material of a metal or metal containing material and a powdery or particulate material of a supplement component or supplement component containing material or alternatively a powder or particulate material or from mixtures comprising a powdery or particulate material, which contains a metal component and a supplement material, in particular contained in one powdery or particulate material. Such powdery or particulate materials are preferably used for the preparation of pellets. The mixtures used for the preparation of pellets generally contain a supporting material, optionally a binding agent and optionally a pore builder, where preferably all materials are powdery or particulate materials.

The catalyst is preferably made of particles or powders with particles of a size in the range of typically 50 nm to 5 mm, preferably in the range of 100 nm to 1 mm, more preferred in the range of 100 nm to 0.1 mm, particularly in the range of 250 nm to 50 µm or 250 nm to 1 µm. The mentioned particle sizes also apply for materials used for producing catalyst pellets. A powdery catalyst, in particular with a particle size in the range of 10 to 50 µm, is used advantageously in micro reactors.

An alternative process for the preparation of the catalyst uses a support material or carrier, which are loaded with the metal component and the supplemental component by using solutions or dispersions. It may be started with the preparation of shaped bodies, e.g. pellets, made with plain support material similar to the process described above. Such porous bodies are loaded with the metal component and the supplemental component, which can be done in steps or simultaneously. The metal loading may be a first step, e.g. the shaped bodies are soaked with a metal salt solution, followed by reduction and sulfidizing. Next step is the loading or coating with the supplemental component, for instance a dispersion of Nafion® or PANI is applied, which leads after drying and sintering to a thin, porous layer. The sequence of the steps may be reversed, i.e. applying first the supplemental component and second the metal component. For simultaneous loading the metal salt may be added to the dispersion or the supplemental component may be added to the metal salt solution.

For the preparation of the catalyst a conventional catalyst may be used. A conventional catalyst may be coated with the supplemental component. A conventional Ni/Mo- or Co/Mo-catalyst, preferably with a porous support, may be treated with a solution or dispersion of a supplemental component. As an example a porous coating with Nafion® or PANI can be prepared as described above. A conventional catalyst, e.g. a powder or powderized, may serve as a metal component in the preparation of the catalyst. Such material may be used in a mixture for preparing a shaped body as described above. Suitable conventional catalysts are mentioned in U.S. Pat. Nos. 4,992,605, 5,705,722 and WO 2007/103027 A1.

The catalyst also comprises a combination of separate materials, i.e. of a material or materials, which contain the metallic component, and a material or materials, which contain the supplemental component. This may be a mixture of such materials, preferably powder mixtures. An example is a mixture of a conventional catalyst (e.g. for hydrogenation) and a material or materials, which contain the supplemental component. Such combination contains separate components, which are in close contact, especially when used as catalyst. A close contact is improved, if at least one component, either metal or supplemental component, is a material of fine or very fine particles (e.g. particles smaller than 200 μm, preferably smaller than 100 μm, more preferable smaller than 50 μm; or nano-particles, i.e. smaller than 1000 nm). The other component may be a coarse or bulk material, like grains, pellets, shaped bodies or even a plate, preferably with a rough or porous surface, where fine particles can adhere or penetrate. The contact and interaction of the materials of a combination might be so strong, that the property of being separate is lost or nearly lost. This is the case, when a material adheres or penetrates, especially if one component or a constituent of a component melts, which might occur in the preparation of the catalyst or in situ at the reaction temperature. Such effect can be intentionally applied or used.

Therefore, another embodiment of the present invention is a catalyst, in particular a catalyst for hydrogenation, comprising at least a metallic component and at least a supplemental component, where the components may be present as separate materials and where preferably at least one component is present as solid particles, particularly as fine or very fine particles. Preferably the catalyst is obtainable by use of at least one non-metallic, conductive material, as solid particles and/or as a solution, in its preparation.

The content of a metal component and of a supplement component in a catalyst vary strongly, which depends on its use and the selected materials for its preparation. The metal component e.g. may lie in a range of 0.01 to 95 wt.-% (percent by weight) of the whole catalyst or catalyst pellet. Low metal contents in the range of 0.01 to 10 wt.-% are encountered, when coatings or coated or impregnated materials are employed in the preparation of the catalyst. Metal powders in pellets generally are contained in a range of 5 to 50 wt.-%, typically in a range of 5 to 40 wt.-%. A supplement component in a catalyst or pellet may vary generally in a range of 0.01 to 50 wt.-%, typically it lies in the range of 1 to 40 wt.-%, preferably in the range of 10 to 40 wt.-%. If a supporting material is present, the content of a supporting material generally lies in the range of 5 to 60 wt.-%, but may be higher. If a binding agent is present, the content of it generally lies in the range of 5 to 40 wt.-%, preferably in the range of 15 to 35 wt.-%. As an example a final pelletized catalyst contains the metal component in a range of 5 to 50 wt.-%, the supplement component a range of 5 to 40 wt.-%, a supporting material in a range of 0 to 60 wt.-% and a binding agent in a range of 10 to 40 wt.-%, where the amounts of all constituents are chosen to sum up to 100 wt.-%. Preferably the catalyst contains the metal component in a range of 5 to 40 wt.-%, the supplement component a range of 5 to 25 wt.-%, a supporting material in a range of 0 to 40 wt.-% and a binding agent in a range of 10 to 25 wt.-%, where the fractions sum up to 100 wt.-%.

Surprisingly it was found that the catalysts according to the invention, especially catalysts with a hydrophobic supplemental component, promotes strongly the hydrodecarboxylation route (cf. eq. (3)) in the hydrogenation of organic oxygen containing compounds like vegetable oils, in some cases the reaction proceeds even nearly totally in the direction of the hydrodecarboxylation route. This makes the catalysts superior to the catalysts according to the state of the art.

The catalysts according to the invention show several further advantages compared to conventional catalysts. They do not only reduce the consumption of hydrogen, but they also stabilize the yield. While normally the yields with conventional catalysts change, the catalysts according to the invention always achieve at least 96% yield of pure hydrocarbons in the hydrogenation of vegetable oils. Undesirable side reactions are nearly totally prevented. Such a parasitic side reaction is the well-known reversed shift-reaction: $CO_2 + H_2 \rightarrow CO + H_2O$, which can occur as a parasitic reaction during the hydrogenation reaction. In this reaction hydrogen is consumed under formation of carbon monoxide. In addition, the usual formation of methane by the reverse reforming reaction $CO + 3 H_2 \rightarrow CH_4 + H_2O$ cannot be detected.

The catalysts according to the invention showed good or excellent performance with all tested oily or fatty compounds as feedstock for hydroprocessing. Such a feedstock comprises in particular all vegetable oils, namely rape seed oil, sun flower oil, palm oil, nuts oil, olive oil, colza oil, canola oil, tall oil, hemp seed oil, linseed oil, mustard oil, peanut oil, castor oil, coconut oil, train oil, lard, tallow and jatropha oil. Further examples are oils from algae and the pyrolysate from plant-biomass (in particular wood), called bio-oil. In addition animal fats and fatty acids have to be mentioned as suitable feedstock, not to forget the fish oils. All liquefied materials from plants and animals, particularly from waste materials, may be used for the conversion to fuel by the catalysts, where certain catalysts, depending on the kind of feedstock and the reaction conditions are more adapted. Generally any organic oxygen containing liquid product of biological origin can be used. The mentioned substances are summarized under the term "oxygen containing organic products".

The hydroprocessing of oxygen containing organic products in the presence of a catalyst according the invention yields fuels, which are mixtures of pure hydrocarbons. Such obtained mixtures generally have a boiling point below 350° C. and a cetane number of at least 40 according the German standard DIN-51773.

Another embodiment of the present invention is the use of a material or material mixture or material combination, containing a metallic component and a non-metal conductive material, as a catalyst, preferably as a catalyst for hydroprocessing of organic products, more preferable as a catalyst for hydroprocessing of oxygen containing organic products, in particular as a catalyst for hydroprocessing of oxygen containing organic products for the production of saturated hydrocarbons or fuels.

The catalysts are suitable for co-processing, since they are active in hydroprocessing of oxygen containing organic products as well as in hydrocracking of petroleum based hydrocarbons. Co-processing is described in the publication "G. W. Huber, P. O'Connor, A. Corma: Processing Biomass in conventional oil refineries: Production of high quality diesel, in Applied Catalysis A: General Vol. 329, p. 120-129 (2007)".

Therefore, an embodiment of the present invention is also the use of a material or material mixture or material combination, containing a metallic component and a non-metal conductive material, as a catalyst for co-processing, i.e. the simultaneous hydrogenation of oxygen containing organic products and fractions from crude oil refinery.

A further embodiment of the present invention is a process for hydrogenation of oxygen containing organic products, products occurring in oil refinery or a mixture of these products, wherein the product is brought into contact with a material, mixture of materials or combination of materials that contain a metal component and a non-metal conducting component or the catalyst in the presence of hydrogen gas at a temperature in the range of 100 to 500° C. and at a pressure in the range of 10 to 1000 bar.

The hydrogenation process using the catalyst according to the invention operates usually with hydrogen at a pressure in the range of 10 to 250 bar, preferably in the range of 10 to 100 bar, more preferable in the range of 10 to 80 bar, in particular in the range of 10 to 60 bar. The reaction temperature generally ranges from 50 to 450° C., preferably from 100 to 400° C., in particular from 100 to 350° C.

The process is generally operated in a stirred-batch tank reactor, e.g. an autoclave, or in a continuous tank reactor or a plug flow reactor. For a continuous operation a micro reactor system is of great advantage. In a micro reactor the catalyst is preferably applied in form of a bed, a fixed bed or a coating, in particular as a wall coating of a micro channel.

A further preferred embodiment of the invention is the application of a micro reactor for hydroprocessing of oxygen containing organic products. One advantage is the highly uniform heat distribution in the reaction zone. The other advantage is the extremely high contact in the multi-phase mixture of hydrogen gas, catalyst and feedstock. The result of both is the extreme reduction of reaction time and enhancement of the selectivity. Micro reactors are described for example in EP 0688242 B1 and U.S. Pat. No. 5,811,062. Micro reaction systems for hydrogenation comprise a pressurized hydrogen gas source, a feed delivery system and a mixing unit for gas and liquid feedstock, which can be incorporated into the micro reactor, and a micro reactor.

The system with a micro reactor for hydrogenation processes is generally described in the publication of the US Department of Energy in the framework Industrial Technologies Program, titled "Microchannel Reactor System for Catalytic Hydrogenation" and can be downloaded at http://www.eere.energy.gov/industrychemicals/pdfs/microchannel.pdf.

A preferred micro reactor for hydroprocessing is a micro channel reactor and generally contains several plates with several engraved microchannels, which work parallel.

The catalyst is generally used as a fixed bed, a film or a coating in a micro reactor.

The invention is illustrated by the following examples and the experimental data in the tables.

EXAMPLE 1

The Process of Hydroprocessing in Batch Operation

A batch process was used for comparing the activity and performance of conventional catalysts with catalysts according to the invention. To establish a basis of comparison, first a catalyst according to the state of the art was tested as follows.

30 g of a conventional granular nickel catalyst (e.g. from Süd-Chemie AG, Germany) was filled into a wired cage, which was put into a laboratory autoclave with a volume of ca. 1 Liter. Also, an amount of 80 ml rape seed oil mixture was charged into the autoclave. The remaining free volume in the autoclave for the hydrogen gas amounted to a volume of 810 ml. The pure rape seed oil was analyzed regarding the double bonds contained in the mixture. The latest varieties of the plants yield oils with a higher percentage of double and triple unsaturated carbonic acids (instead of only oleic acid), but also some portion of saturated carbonic acids within the glycerine-ester. Palm oil, on the contrary, contains much less oleic acid but more saturated carbonic acids (palmitinic acid). By addition of palm oil to the rape seed oil the average number of double bonds per oil molecule could be decreased to an average proportion of about 10%. According to the analytical results a mixture was prepared in such a way, as if 3 oleic acid molecules per oil molecule were present. The oil had then a density of 0.92 g/cm$^3$ and a molar mass of 881 g/mole. The oil was pretreated by neutralisation and drying. The autoclave was connected to a hydrogen gas supply and filled with 40 bar hydrogen gas. Pressure and temperature were controlled and fixed exactly in order to define the amount of hydrogen, which was 1.31 mole at a temperature of 27° C. (300 K). The autoclave was placed in an electrically heated and controlled oven and was equipped with a stirring device for thorough mixing.

Due to the heating, at the beginning, the pressure had doubled to exactly 80 bar and was measured continuously till the end of the reaction, when it fell to 39.5 bar. The conversion of the vegetable oil was accomplished after 1 hour at the latest. The analysis of the resulting liquid by GCMS yielded 61 g of liquid hydrocarbon from 73.5 g rape seed oil. There was nearly no unconverted oil left, i.e. a turnover of almost 100%. In addition, the gas phase was investigated by GCMS and 0.081 mole propane and 0.49 mole water vapour as well as 0.062 mole hydrogen determined. Small amounts of methane, other gaseous hydrocarbons, carbon monoxide and carbon dioxide were detected but not determined. The composition of the gas phase was recalculated into partial pressure values: $p(H_2)=3.8$ bar, $p(C_3H_8)=4.9$ bar, $p(H_2O)=30.0$ bar and $p(residue)=0.5$ bar, summing up to the total pressure $p(327°\ C.)=39.5$ bar. After cooling down to room temperature (26-27° C.) the total pressure amounted to $p(27°\ C.)=4.3$ bar, the partial pressures to $p(H_2, 27°\ C.)=1.9$ bar, $p(C_3H_8, 27°\ C.)=2.3$ bar and $p(residue, 27°\ C.)=0.3$ bar; the water had condensed. The partial pressures have been calculated applying the van der Waals equation by using the compressibility factors, which have been derived from tables in the literature, if available. If unknown, the figures have been calculated using the equation with the reduced temperature and reduced pressure as well as the critical temperature and the critical pressure. These figures are temperature and pressure dependent and nearly equal to 1, especially at high temperatures. The compressibility factor of hydrogen is somewhat larger than 1 and the one of water vapour somewhat smaller than 1, so they are nearly compensating themselves in a way each other. The factors of propane and carbon dioxide are a little smaller than 1, have however been considered. Thus, the mistakes concerning the figures of the partial pressures are only in a range of a few percent.

As result of this example 1 it can be summarized, that the hydroprocessing of the oil into liquid hydrocarbon was nearly complete. 15 mole hydrogen per mole of oil was used and the side products were 1 mole of propane and 6 mole of water and nearly no carbon dioxide and other side products; about 5% of the applied hydrogen was left. The experiment showed, that the oil reacted via the hydrodeoxygenation route (equation 3) using the maximum amount of hydrogen according to the theory. The following experiments demonstrate, that a considerable amount of hydrogen is to be saved by using the catalyst according the invention.

Although it was possible to carry out this experiment with a catalyst in the form of grains in a cage, catalyst material was compacted into pellets, which could be applied more comfortable. The pellets had the dimensions of a round pellet with a diameter of 10 mm and a thickness of 3 mm and thus with a volume of 0.236 cm$^3$. Other dimensions are possible and depend on the special application of the catalyst.

EXAMPLE 2

Mixed Catalyst with High-Surface-Area-Graphite as Supplement Component

Whereas example 1 describes the process of hydroprocessing of a rape seed oil mixture with a catalyst of the state of the art, this example shows the effect of a catalyst according to the invention mixed with a supplement component, namely with a carbon black of type Vulcan XC-72 ® from Cabot Corp., UK, as powder with a particle size less than 10 µm; it has a high surface area and a high electrical conductivity. The composition of the catalyst pellet is listed in the table 2. This pellet consists of 10 vol.-% nano-nickel powder of the particle size less than 1 µm, 3 vol.-% nano-molybdenum powder of the particle size less than 1 µm, 13 vol.-% carbon black powder (porosity ca. 50%, particle size<10 µm), 24 vol.-% aluminium oxide powder (porosity ca. 50%, particle size<10 µm), 25 vol.-% PTFE of a particle size<40 µm, 25 vol.-% sodium sulfate of a particle size<100 µm. After sintering and dissolution of the sodium sulfate, which causes the intended course porosity in addition to the fine porosity of the alumina, the pellets have been stored in a hydrogen sulfide atmosphere at slightly elevated temperature, whereas nickel sulfide and molybdenum sulfide have formed at the surface. The pellets weighed 0.694 g each, 43 pieces, hence 30 g, and had a porosity (coarse and fine) of about 60%. Before the dissolution of the sodium sulfate the pellet weighed 0.853 g. The composition of the pellets can vary depending on the requirements, which the plant has to meet for the oil product and the catalyst.

The hydroprocessing of the rape seed oil mixture has been carried out according to the experiment in example 1, using in this case the catalyst just described. Again 30 g of catalyst (ca. 10 ml) and 80 ml rape seed oil mixture as well as 1.31 mole hydrogen (40 bar) were used. After the reaction at 330° C. the following results were measured:

The pressure after the reaction was 76 bar and the yield of liquid hydrocarbons was 62 g corresponding to 98% of theory. Unreacted rape seed oil (detection limit: 0.1 ml) and side products could not be detected. The gas phase was again investigated by GCMS and 7.9 g carbon dioxide and 2.45 g water vapor were determined. The partial pressures were 51.7 bar hydrogen, 5.0 bar propane, 11.0 bar carbon dioxide and 8.4 bar water vapor. The ratio of the values of $CO_2$ and $H_2O$ shows how much of the rape seed oil undergoes hydrodecarboxylation, i.e. hydrogenation under $CO_2$ formation, and how much undergoes hydrodeoxygenation, i.e. hydrogenation under $H_2O$ formation.

The experimental conditions applied were not favorable, because the amount of hydrogen in the available space of the autoclave was too large in relation to the amount of oil. Therefore, the amount of rape seed oil mixture was increased to 132 ml and filled into the same autoclave together with 1.23 mole hydrogen under a pressure of 40 bar at 27° C. The autoclave was again heated up to 330° C. After about ½ hour the pressure was 47.2 bar and did not decrease further. Now a gas sample was extracted and measured and then the autoclave was cooled down and the pressure was measured at 27° C. At last the nature and amount of liquid was determined after opening of the autoclave: 100.5 g of hydrocarbons and no residual rape seed oil; hence the yield was 99% of theory.

The liquid hydrocarbon mixture contained mainly of heptadecane and octadecane. The results are: 0.300 mole carbon dioxide and 0.228 mole water. Hence, a fraction of 0.10 mole of the initial amount of 0.138 mole) rape seed oil applied underwent hydrodecarboxylation during the hydrogenation and a fraction of 0.038 mole underwent hydrodeoxygenation. This result is practically equal to the previous one and proves, that an excess of hydrogen of 5% is sufficient. Therefore, the following examples were carried out with an excess of hydrogen of 5%. The fraction of the carbon dioxide route for the oil conversion resulted to 0.721 and of the water route to 0.279. The pressure values after the reaction at 327° C. and 27° C. were: for the total pressure 47.2 bar/15.8 bar, for the partial pressures for $CO_2$ 19.4 bar/9.4 bar, for propane 9.0 bar/4.4 bar, for water vapor 15.0 bar/-- and for residual hydrogen 3.8 bar/1.9 bar. Less than 1% of the gas phase were other hydrocarbons, especially methane, and carbon monoxide were determined.

Summing up: The hydroprocessing of 0.138 mole rape seed oil could be carried out completely, whereas 72% of the oil reacted according to the carbon dioxide route and 28% according to the water vapor route. The molar ratio of hydrogen to oil was 8.9, whereas it was 15.75, when the commercial catalyst was used. Thus, compared with a catalyst of the state of the art, a reduction in hydrogen consumption of 43% was achieved.

EXAMPLE 3

Mixed Catalyst with Carbon-Nano-Tubes as Supplement Component

As indicated in table 2 the supplement component can be replaced by another conductive hydrophobic component, for instance carbon nano-tubes. This material is known as a highly active adsorbent with a high surface area and can be bought for instance from Johnson Matthey GmbH, Germany. This mixed catalyst was prepared as pellets. Not only the volumetric composition but also the gravimetric composition was the same. The hydroprocessing reaction was also carried out in the same way. Only some more rape seed oil mixture was applied in order to keep the excess of hydrogen to 5%, adding up to a total of 1.225 mole at the starting pressure of 40 bar. The oil amount was 0.143 mole (=137 ml). After the conversion at 330° C. the pressure amounted to 47.7 bar. A product sample was analyzed by GCMS measurement and resulted in 14.4 g=0.327 mole carbon dioxide and 3.7 g=0.205 mole water vapor. The proportion of the two reaction routes was calculated from these values. It amounted to 76.1% for the hydrodecarboxylation and 23.9% for the hydrodeoxygenation route. Moreover, an amount of 104 g of liquid hydrocarbon was determined. That means that the conversion was also nearly quantitative (99%). The following pressure values are determined at 327° C. and 27° C.: total pressure 47.7 bar/16.6 bar, partial pressures of hydrogen 3.8 bar/1.9 bar, of propane (calculated) 9.1 bar/4.5 bar, of carbon dioxide 21.4 bar/10.2 bar, and of water vapor 13.4 bar/--. Methane and carbon monoxide were present in an amount of less than 1%. The main results of the hydroprocessing were: nearly total conversion to liquid hydrocarbons, 76% conversion via hydrodecarboxylation, molar ratio of hydrogen consumption to oil 8.6, hydrogen consumption of 54% resulting in a hydrogen saving of 46%. Consequently, this catalyst demonstrated a slightly better performance than the previous one.

EXAMPLE 3A

Mixed Catalyst without Supplement Component

In the following, a catalyst without supplement component was tested in order to show the difference regarding the performance, namely that much more hydrogen is necessary for the conversion using a catalyst without supplement component. This was already shown in example 1 using a commercial catalyst. Now, in a similar experiment a catalyst was prepared like the one in example 3, but without the supplement component. The composition is shown in table 1. The values are 13 vol.-% nano-nickel powder of a particle size less than 1 μm, 4 vol.-% nano-molybdenum powder of a particle size less than 1 μm, 27 vol.-% aluminium oxide powder (porosity ca. 50%, particle size<10 μm), 26 vol.-% PTFE of a particle size<40 μm, 30 vol.-% sodium sulfate of a particle size<100 μm. After sintering and dissolution of the sodium sulfate, the pellets have been stored in a hydrogen sulfide atmosphere at slightly elevated temperature, whereupon nickel sulfide and molybdenum sulfide have formed at the surface. The pellets weighed 0.747 g each, a total of 40 pieces hence amounted 30 g. After the treatment just described the porosity (coarse and fine) added up to about 50%. The hydroprocessing of the oil with this catalyst (without supplement component) was carried out in the same way like the other previous experiments. An amount of 80 ml=0.083 mole rape seed oil mixture was applied together with 1.31 mol hydrogen at 40 bar. The oil was converted nearly completely to liquid hydrocarbons and propane as in the other experiments too. However, no carbon dioxide was detected, in other words, the conversion took place according to the hydrodeoxygenation route with water formation exclusively. Thus, it is stated that a catalyst without a supplement component according to the invention needs the maximum theoretical amount of hydrogen for the hydroprocessing of oil.

EXAMPLE 4

Mixed Catalyst with Raney-Nickel-Alloys and Graphite as Supplement Component

A Raney catalyst requires a somewhat elaborate fabrication, which can be seen from the preparation of Raney-nickel-molybdenum. An amount of 47 g nickel powder, 19 g molybdenum powder and 81 g aluminium powder are mixed, and the mixture is heated up until the reaction starts. After cooling an alloy $Ni_{0.8}Mo_{0.2}Al_3$ has been formed, which has the density of ca. 3.9 g/cm³. This Raney alloy has to be ground, in order to apply it for the preparation of the mixed catalyst in the form of pellets, which has been described previously. As can be seen in table 3, the following composition has been chosen: 15 vol.-% Raney-aluminium-alloy powder of a particle size<100 μm, 15 vol.-% carbon-nanotubes<10 μm, 20vol.-% aluminium oxide of a particle size<10 μm, 25 vol.-% PTFE of a particle size<10 μm, 25 vol.-% sodium sulfate of a particle size<100 μm. After compacting and sintering, the pellets were treated with water, which was made alkaline. In this way, the sodium sulfate as well as the aluminium hydroxide, formed temporarily, has been dissolved before the pellet could be disintegrated. Finally the dissolution of the aluminium was finished by treatment with potassium hydroxide solution, while hydrogen was developing. After that, the pellets were dried in a vacuum drying oven or stream of warm nitrogen. Treatment with hydrogen sulfide followed. One has to pay attention, not to expose the pellets to air after removal of the aluminium hydroxide, because Raney-nickel is pyrophoric. The pellets had a porosity of ca. 60% and had a weight of 0.455 g. An amount of 30 g was used for the hydroprocessing experiment, which was performed as described before.

Surprisingly, in the sample of the gas phase very little water vapour has been detected besides propane and carbon dioxide after the ending of the reaction at 327° C. Hence, the hydroprocessing proceeded completely according to the hydrodecarboxylation route. The experiment was repeated with the minimal amount of hydrogen and correspondingly maximal possible amount of the oil. An amount of 0.184 mole rape seed oil mixture and 1.159 mole hydrogen at 40 bar were applied. The result amounted to 131 g liquid hydrocarbon and 24.0 g carbon dioxide, and the pressure decreased to 54 bar. Using this catalyst, namely the combination of Raney-nickel alloy with carbon-nanotubes, it was possible to hydroprocess vegetable oil completely to the desired product applying only an amount of 40% of the hydrogen, which is necessary in the case a conventional catalyst is used. Hence, the saving of hydrogen was 60%, which is the possible maximum.

EXAMPLE 5

Mixed Catalyst with Raney-Cobalt-Alloys and Diamond

Raney based catalysts are very active and therefore other compositions together with other supplement components had to be tested. As an example, a catalyst containing Raney-Cobalt-Molybdenum alloy with powder of boron doped diamond as supplement component has been prepared (table 4). A well-known preparation method for boron doped diamond is the hot wire CVD procedure, described for instance in DE 602004002313 T2. Prior to usage, the boron doped diamond is milled down to a powder with a mean grain size of 1 μm. Because of the high density of diamond (3.5 g/cm³) the recipe for catalyst preparation had to be adapted. Diamond particles are not porous, therefore the amount of pore builder, alumina and sodium sulfate was increased in order to maintain the required porosity. The test procedure was applied as described before. The performance of this catalyst is comparable with example 4 with a hydrogen consumption of 60%. Raney catalysts are favourable in respect of a great variety of application forms. For example this catalyst was sintered with carbon nickel on to a 2 cm×2 cm nickel sheet, which was formed like a Raschig ring. With this type of catalyst nearly the same results as in example 4 were obtained.

EXAMPLE 6

Catalyst with Supplement Component and an Impregnated Support

This preparation method differs totally from the beforehand described preparations. The metallic component is not used as pure particles but as particles derived from a metal coated support used in conventional catalysts. After milling such coated material it can be mixed with a wide range of supplement components and the resulting mixture can be further processed to mixtures with any suitable supplement component with many different structures. The coated material was prepared as follows. Commercially available alumina with a high inner surface and a porosity of about 50% was several times impregnated with a solution of nickel nitrate $(Ni(NO_3)_2 \times 6H_2O)$ and ammonium molybdate $(NH_4)_6Mo_7O_{24} \times 4H_2O)$ to yield a content of about 10 mole-% of the nickel-molybdenum-alloy on the alumina support. The catalyst pellets contained the following four components in equal proportions: supported Ni—Mo-catalyst, pulverized carbon as supplement component, PTFE as the binding agent and sodium sulfate as pore builder (table 5).

The preparation procedure is described under example 3. As carbonaceous supplement component carbon nanotubes were used. The total amount of the catalyst prepared in this manner was 30 g corresponding to 60 pellets. Because of the low metal content the sulfidization was carried out gently.

Because a high ratio of the hydrodecarboxylation was to be expected, a higher amount of feedstock was charged into the autoclave, so an amount of 157 ml corresponding to 0.164 mole rape seed oil was chosen for the hydrogenation experiment. All other reaction conditions remained equal compared to former experiments. The reaction mixture in the autoclave was stirred very effectively. Soon after ½ hour no further pressure drop was observed, the pressure levelled at 52.3 bar.

The analysis of the product mixture resulted in 20.5 g $CO_2$ and 1.2 g $H_2O$ in the vapor phase. These figures result to a total of 0.155 mole rape seed oil converted via the hydrodecarboxylation route. As product, 120 g liquid hydrocarbons were collected in which unconverted rape seed oil could not be detected. Consequently, 94.5% of the feedstock was converted via the hydrodecarboxylation route. That means that only 46% of the hydrogen was consumed, which would be nececessary with a catalyst of the state of the art. Instead of carbon nanotubes other conductive hydrophobic supplement components can be applied.

EXAMPLE 7

Catalyst Containing Diamond as Supplement Component Combined with a Tungsten Catalyst Impregnated in a Support A modification of the catalyst described above is accomplished successfully by substituting molybdenum by tungsten and applying boron doped diamond as supplement component. The application of diamond is described above. Because of the lack of porosity of diamond, the amount of pore builder was increased. So the composition of the pellet resulted in 20 vol.-% diamond powder, 30 vol.-% $Na_2SO_4$, whereas the proportion of the other components remained constant. The exact composition is listed in table 6. After dissolving the $Na_2SO_4$ a porosity of the pellet resulted in about 40%.

For the experiment the autoclave was charged with 55 pellets and operated under the conditions described above. The results concerning conversion and hydrogen consumption are similar to example 6. This fact demonstrates that there is still some potential to improve the catalyst further to even higher reduction of hydrogen consumption.

EXAMPLE 8

Alternative Preparation of Catalyst by Means of Sintering Nickel Powder

In the case that a mechanically very stable catalyst is needed, it is preferred to bind the catalyst components by sintering of nickel powder. Also other moulds can be prepared in this way. For example, a mixture for preparing catalyst pellets is composed of 25 vol.-% carbonyl-nickel (particle size less than 3 µm), 3 vol.-% molybdenum powder (particle size less than 3 µm), 25 vol.-% graphite powder, electrical conductive (particle size less than 20 µm), 22 vol.-% alumina (particle size less than 10 µm), and 25 Vol.-% sodium sulphate (particle size less than 200 µm). For details see table 8.

After pressing the pellets, they were sintered in a reducing atmosphere at about 600° C. After dissolving the included $Na_2SO_4$ the pellets were sulfidized and then ready for application. The autoclave was charged with 33 pellets for the hydroprocessing experiment with standard conditions. Regarding the former results, a conversion rate of about 80% following the hydrodecarboxylation was to be expected. Therefore an amount of 142 ml resp. 0.148 mole rape seed oil and 1.234 mol hydrogen at a pressure of 40 bar have been employed. As a result, all three carbon based components used in the catalyst as alternatives, yielded a complete conversion to the target hydrocarbons. With a hydrogen consumption of about 52%.

EXAMPLE 9

Catalyst with an Organic Polymeric Material as Supplement Component

Another supplement component directing the reaction to the hydrodecarboxylation route, is Nafion®. This is a perfluorinated and sulfonated organic polymer with ion exchanging groups, hence revealing ionic conductivity. Another organic polymer with ionic (protonic) conductivity is polybenzimidazol as a complex with phosphoric acid. Additionally, there are other organic polymers which can conduct or carry electrical charges. Electrical conductivity is enabled by donor-acceptor-complexes or via pi-electron conduction. For example, polyaniline (PANI) is a well-known organic electrical conducting polymer.

Principally those substances are applicable, but most of them are unstable under the conditions of the hydrogenation process or at the high sintering temperature in the catalyst preparation process. For this reason binding materials are needed which operate at low temperature compatible with the stability of the conducting polymeric material.

Another way to circumvent this problem and to avoid thermal decomposition during the catalyst preparation process, these organic conducting materials are impregnated in form of a solution or suspension into the catalyst after the last thermal preparation step.

Thus, first a catalyst pellet is prepared consisting of alumina, alumina coated with the catalytic metal, a pore forming material. Binder could be high temperature sintering PTFE or silicate cement. After sintering, the pellet is impregnated with the solution or suspension of the conducting organic material in order to incorporate the supplement component. As a last step the catalyst may be sulfidized as described before. This is the method of preparation of the catalyst (type No. 6, table 7) in the table. Successfully, the catalyst pellets were treated with an alcoholic suspension of Nafion®. The result was a metal surface which was intentionally only partially covered.

The performance of those catalysts was tested under standard conditions as described before. It turned out that the best target numbers could not be reached. Nevertheless, a high selectivity for the hydrodecarboxylation route and hence the ability to reduce hydrogen consumption of about 50% was determined.

EXAMPLE 10

Operating a Microreactor with a Catalyst According to the Invention

The microreactor consists of a number of stacked stainless steel plates in whose surface micro channels are engraved. The dimensions are width=1.5 mm, depth=1.0 mm, length=64 mm. A number of 60 of those channels are supplied with liquid feedstock by means of a high pressure metering pump from a reservoir and with pressurized hydrogen gas from a gas cylinder. In a mixing zone incorporated on the channel plate a micro-emulsion of gas and liquid is formed which is distributed to the micro channels and passes from there the catalyst bed (e.g. Losey, M. W., Schmidt, M. A., Jensen, K. F. Ind. Eng. Chem. Res. 2001, 40, 2555). Before operation, the catalyst bed was formed by washing the catalyst particles into the channels. The particles are hold in the channels by means of a plurality of overlapping micro barriers as described in the literature, e.g. (Losey, M. W. et al., see above).

In this experimental example particles of catalyst (type No. 7, table 8) are used. They are milled down to a mean grain size d(50) of d(50)=25 µm. In 60 channels on one plate a volume of 4 ml is filled in. After connecting the tubes for liquid and gas the whole reactor stack is electrically heated and thermostatted at T=327° C. Every plate is supplied with hydrogen gas at a pressure of 10 bar and with rape seed oil with a feed rate of 0.36 ml/min resp. 0.18 g/min rape seed oil per hour. The product emulsion at the exit of the reactor is degassed and sampled and analyzed by gas chromatographic means. The mean analysis data after an operation time of 5 hours under constant conditions resulted in a yield of heptadecane, which corresponds to 98% of the theory. The effectivity is calculated as a production rate per hour related to the amount of the catalyst and results in a four-fold enhancement corresponding to the operative results obtained in a conventional autoclave. The properties and purity of the product equals to the products yielded in conventional autoclave operations. The aforementioned reactor and procedure is suitable for a production rate of about 1000 kg bio-fuel per day.

Tables 1 to 8

Table 1 shows the composition of a catalyst, which is used for comparison. The tables 2 to 8 show exemplary compositions of catalysts according to the invention, in particular of pelletized catalysts used for hydroprocessing. The listed raw pellets contain sodium sulfate as a pore builder (usually in the range of 10 to 40 wt.-% in the raw pellet), which is removed in the preparation of the pellets ready to use, the final pellets. The final pellets had a volume of 0.236 cm$^3$ in all cases shown. The weight in gram of the pellet is shown in the last line of the third column of the tables. The fourth column of the tables contains the composition of the pellet in percent by weight and the fifth column of the tables contains suitable ranges of the composition of the pellet in percent by weight.

All data concerning the content in percent by weight (wt.-%) refer to the catalyst ready to use, i.e. the final pellet.

Remarks:
[1]) Vulcan XC-72® or other conductive carbon-material, e.g. also carbon nanotubes
[2]) content of metal in the final pellet typically 0.02 g
[3]) Nafion or PANI or other conductive polymer; content of polymer typically 0.03 g

TABLE 1

Composition of catalyst pellets without supplement component

|  | vol.-% | g per pellet | wt.-% |
|---|---|---|---|
| nano-Ni | 13 | 0.273 | 36.5 |
| nano-Mo | 4 | 0.085 | 11.4 |
| Al$_2$O$_3$ | 27 | 0.255 | 34.1 |
| PTFE | 26 | 0.135 | 18.1 |
| Na$_2$SO$_4$ | 30 | 0.191 |  |
| sum | 100 | 0.938 |  |
| pellet |  | 0.747 | 100 |

TABLE 2

Type No. 1 of composition of catalyst pellets

| nano + C[1]) | vol.-% | g per pellet | wt.-% | wt.-% range |
|---|---|---|---|---|
| nano-Ni | 10 | 0.210 | 30.2 | 10-50 |
| nano-Mo | 3 | 0.064 | 9.2 | 3-30 |
| C[1]) | 13 | 0.064 | 9.3 | 3-30 |
| Al$_2$O$_3$ | 24 | 0.226 | 32.6 | 4-40 |
| PTFE | 25 | 0.130 | 18.7 | 10-40 |
| Na$_2$SO$_4$ | 25 | 0.159 |  |  |
| sum | 100 | 0.853 |  |  |
| pellet |  | 0.694 | 100 |  |

TABLE 3

Type No. 2 of composition of catalyst pellets

| Raney + C[1]) | vol.-% | g per pellet | wt.-% | wt.-% range |
|---|---|---|---|---|
| Ni$_{0.8}$Mo$_{0.2}$Al$_3$ | 15 | 0.062 | 13.6 | 5-25 |
| C[1]) | 15 | 0.074 | 16.3 | 5-25 |
| Al$_2$O$_3$ | 20 | 0.189 | 41.5 | 0-60 |
| PTFE | 25 | 0.130 | 28.6 | 20-40 |
| Na$_2$SO$_4$ | 25 | 0.159 |  |  |
| sum | 100 |  |  |  |
| pellet |  | 0.455 | 100 |  |

TABLE 4

Type No. 3 of composition of catalyst pellets

| Raney + diamond | vol.-% | g per pellet | wt.-% | wt.-% range |
|---|---|---|---|---|
| Co$_{0.8}$Mo$_{0.2}$Al$_3$ | 15 | 0.062 | 12.3 | 5-25 |
| diamond | 15 | 0.124 | 24.6 | 10-40 |
| Al$_2$O$_3$ | 20 | 0.189 | 37.4 | 0-60 |
| PTFE | 25 | 0.130 | 25.7 | 20-40 |
| Na$_2$SO$_4$ | 25 | 0.159 |  |  |
| sum | 100 |  |  |  |
| pellet |  | 0.505 | 100 |  |

TABLE 5

Type No. 4 of composition of catalyst pellets

| soaked + C[1]) | vol.-% | g per pellet | wt.-% | wt.-% range |
|---|---|---|---|---|
| Al$_2$O$_3$/Ni$_8$Mo$_2$[2]) | 25 | 0.248 | 49.5 | 30-70 |
| C[1]) | 25 | 0.124 | 24.8 | 20-40 |
| PTFE | 25 | 0.130 | 25.9 | 15-35 |
| Na$_2$SO$_4$ | 25 | 0.159 |  |  |
| sum | 100 | 0.660 |  |  |
| pellet |  | 0.501 | 100 |  |

TABLE 6

Type No. 5 of composition of catalyst pellets

| soaked + diamond | vol.-% | g per pellet | wt.-% | wt.-% range |
|---|---|---|---|---|
| Al$_2$O$_3$/Ni$_8$W$_2$[2]) | 25 | 0.248 | 45.7 | 30-70 |
| diamond | 20 | 0.165 | 30.4 | 20-40 |

TABLE 6-continued

Type No. 5 of composition of catalyst pellets

| soaked + diamond | vol.-% | g per pellet | wt.-% | wt.-% range |
|---|---|---|---|---|
| PTFE | 25 | 0.130 | 23.9 | 15-35 |
| Na$_2$SO$_4$ | 30 | 0.191 | | |
| sum | 100 | 0.734 | | |
| pellet | | 0.543 | 100 | |

TABLE 7

Type No. 6 of composition of catalyst pellets

| soaking + soaking | vol.-% | g per pellet | wt.-% | wt.-% range |
|---|---|---|---|---|
| Al$_2$O$_3$/Ni$_8$Mo$_2$$^2$) | 25 | 0.248 | 42.9 | 20-60 |
| Al$_2$O$_3$/Nafion$^3$) | 25 | 0.200 | 34.6 | 20-60 |
| PTFE | 25 | 0.130 | 22.5 | 15-30 |
| Na$_2$SO$_4$ | 25 | 0.159 | | |
| sum | 100 | 0.737 | | |
| pellet | | 0.578 | 100 | |

TABLE 8

Type No. 7 of composition of catalyst pellets

| metal sintered | vol.-% | g per pellet | wt.-% | wt.-% range |
|---|---|---|---|---|
| Ni-powder | 25 | 0.525 | 57.1 | 40-80 |
| Mo-powder | 3 | 0.064 | 6.9 | 4-15 |
| C$^1$) | 25 | 0.124 | 13.5 | 7-25 |
| Al$_2$O$_3$ | 22 | 0.208 | 22.6 | 10-30 |
| Na$_2$SO$_4$ | 25 | 0.159 | | |
| sum | 100 | 1.079 | | |
| pellet | | 0.920 | 100 | |

We claim:

1. A process for hydrogenation of oxygen-containing organic products selected from the group consisting of rape seed oil, sun flower oil, palm oil, nuts oil, olive oil, coliza oil, canola oil, tall oil, hemp seed oil, linseed oil, mustard oil, peanut oil, castor oil, coconut oil, train lard, lard, tallow, jatropha oil, oils from algae, the pyrolysate from plant biomass, animal fats, fatty acids, fish oils, and mixtures thereof, wherein the process comprises bringing the oxygen-containing organic products into contact with a catalyst in the presence of hydrogen gas at a temperature in the range of 200 to 500° C. and at a pressure in the range of 10 to 1000 bar wherein the catalyst comprises at least one metal component selected from the group consisting of cobalt, nickel, molybdenum, and tungsten; and at least one non-metallic supplement component that is electrically conducting, and wherein the catalyst includes a mixture of particles of the at least one metal component and the at least one non-metallic supplement component.

2. The process of claim 1, where the hydrogenation is carried out in a batch reactor, a continuous reactor or a micro reactor.

3. The process of claim 1, wherein the catalyst is in the form of a powder.

4. The process of claim 1, wherein the catalyst is in the form of a sintered body.

5. The process of claim 1, wherein the catalyst is in the form of a porous pellet.

6. The process of claim 1, wherein the catalyst further comprises a binding material.

7. The process of claim 1, wherein the catalyst further comprises a pore forming material.

8. The process of claim 1, wherein the metal component of the catalyst is molybdenum.

9. The process of claim 1, wherein the supplement component of the catalyst is hydrophobic or is made hydrophobic.

10. The process of claim 1, wherein the supplement component of the catalyst comprises one or more constituents selected of the group of materials that are graphite, graphite-containing material, graphite-like material, made graphitic material, carbon black, carbon fibers, single-walled carbon nanotubes, multi-walled carbon nanotubes, carbon nanofibers, mesoporous carbon, fullerene, doped diamond, conducting polymers, ion-conducting polymers, polyaniline, polythiophene, polypyrrol, polyacetylene, poly(para-phenylene), poly(para-phenylenvinylene), polyethylendioxythiophene, polybenzimidazole, polyphthalocyanin, ion-exchanging material, ion-exchanging resin, sulfonated polymers, sulfonated high performance polymers, sulfonated PTFE, sulfonated PPS, sulfonated PEEK, polyphosphazene, fullerene hydride, C$_{60}$H$_x$ with x=1-60, and C$_{70}$H$_x$ with x=1-70.

11. The process of claim 1, wherein the metal component of the catalyst comprises a Raney alloy.

12. The process of claim 1, wherein the catalyst or the metal component are sulfided.

13. The process of claim 1, wherein the catalyst further comprises a support material or carrier.

* * * * *